United States Patent
Bowie

(10) Patent No.: US 11,516,138 B2
(45) Date of Patent: Nov. 29, 2022

(54) DETERMINING NETWORK FLOW DIRECTION

(71) Applicant: International Business Machines Corporation, Armonk, NY (US)

(72) Inventor: Dale Bowie, Benowa (AU)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 16/858,889

(22) Filed: Apr. 27, 2020

(65) Prior Publication Data

US 2021/0336890 A1 Oct. 28, 2021

(51) Int. Cl.
| | | |
|---|---|---|
| H04L 47/2441 | (2022.01) | |
| H04L 47/2466 | (2022.01) | |
| H04L 43/0817 | (2022.01) | |
| H04L 43/0888 | (2022.01) | |
| H04L 47/193 | (2022.01) | |

(52) U.S. Cl.
CPC ...... *H04L 47/2441* (2013.01); *H04L 43/0817* (2013.01); *H04L 43/0888* (2013.01); *H04L 47/193* (2013.01); *H04L 47/2466* (2013.01)

(58) Field of Classification Search
CPC ............. H04L 47/2441; H04L 43/0888; H04L 47/193; H04L 47/2466; H04L 43/0817
USPC ........................................................ 370/235
See application file for complete search history.

(56) References Cited

U.S. PATENT DOCUMENTS

| | | | | |
|---|---|---|---|---|
| 8,848,528 | B1 * | 9/2014 | Fanjoy | ................. H04L 43/028 370/231 |
| 9,979,637 | B2 | 5/2018 | Hughes et al. | |
| 2003/0033430 | A1 * | 2/2003 | Lau | ..................... F16H 55/0886 709/245 |
| 2007/0192474 | A1 * | 8/2007 | Decasper | .............. H04L 67/306 709/223 |
| 2008/0077705 | A1 * | 3/2008 | Li | ........................... H04L 69/22 709/236 |
| 2010/0235522 | A1 * | 9/2010 | Chen | ...................... H04L 67/02 709/228 |

(Continued)

OTHER PUBLICATIONS

Mell et al., "The NIST Definition of Cloud Computing", Recommendations of the National Institute of Standards and Technology, Special Publication 800-145, U.S. Department of Commerce, Sep. 2011, 7 pages.

(Continued)

*Primary Examiner* — Meng Vang
(74) *Attorney, Agent, or Firm* — Daniel M. Yeates

(57) ABSTRACT

A computer-implemented system and method identifies a network flow direction. The method includes observing, by a network flow monitor, a plurality of data packets as each data packet travels past a connection point. The method further includes identifying, from the plurality of data packets, a flow session, wherein the flow session comprises a source port, a source device, a destination device, a destination port, and a communication protocol. The method also includes, gathering, from the plurality of data packets, directional metadata. The method includes, comparing the source port and the destination port against a list of common destination ports. The method further includes determining, based on the plurality of data packets, a flow direction of the flow session. The method includes storing the flow session in a database.

19 Claims, 6 Drawing Sheets

(56) References Cited

U.S. PATENT DOCUMENTS

| | | | |
|---|---|---|---|
| 2013/0036469 A1* | 2/2013 | Worth | H04L 63/1408 |
| | | | 726/23 |
| 2015/0124815 A1* | 5/2015 | Beliveau | H04L 45/38 |
| | | | 370/392 |
| 2015/0326486 A1 | 11/2015 | Zawadowskiy et al. | |
| 2016/0352765 A1* | 12/2016 | Mermoud | H04L 63/1458 |
| 2017/0026227 A1* | 1/2017 | Lian | H04L 41/0668 |
| 2018/0324061 A1 | 11/2018 | Khanal et al. | |
| 2019/0058723 A1 | 2/2019 | Kraning et al. | |
| 2019/0230038 A1* | 7/2019 | Hughes | H04L 45/72 |

OTHER PUBLICATIONS

"Identifying whether a flow's direction was reversed", IBM, IBM Knowledge Center, printed Apr. 23, 2020, 2 pages. https://www.ibm.com/support/knowledgecenter/SS42VS_7.3.1/com.ibm.qradar.doc/t_identify_flow_direction.html.

"Service Name and Transport Protocol Port Number Registry", Website, Updated Apr. 7, 2020, 5 pages. https://www.iana.org/assignments/service-names-port-numbers/service-names-port-numbers.xhtml.

"QRadar: Reverse Flow Direction (QFlow and NetFlow)", IBM, IBM Support, printed Apr. 24, 2020, 6 pages. https://www.ibm.com/support/pages/qradar-reverse-flow-direction-qflow-and-netflow.

"NetFlow Direction and it's Value to Troubleshooting", Plixer, Network Operations, Aug. 27, 2013, 8 pages. https://www.plixer.com/blog/netflow-direction-and-its-value-to-troubleshooting/.

Reynolds et al., "RFC 1700—Assigned Numbers", Oct. 1994, 230 pages, <https://datatracker.ietf.org/doc/html/rfc1700>.

* cited by examiner

DETERMINING NETWORK FLOW DIRECTION

BACKGROUND

The present disclosure relates to network traffic, and, more specifically, determining a direction of network traffic flow.

Network flow collectors are used to monitor network traffic and report on the different communications observed on the network. Individual data packets can be observed and grouped together to form summary records for the entire flow session. Monitoring network traffic can give warning of and assist in mitigating potential security threats to the network.

SUMMARY

Disclosed is a computer-implemented method to identify a network flow direction. The method includes observing, by a network flow monitor, a plurality of data packets as each data packet travels past a connection point. The method further includes, identifying, from the plurality of data packets, a flow session, wherein the flow session comprises a source port, a source device, a destination device, a destination port, and a communication protocol. The method also includes, gathering, from the plurality of data packets, directional metadata. The method includes, comparing the source port and the destination port against a list of common destination ports. The method further includes, determining, based on the plurality of data packets, a flow direction of the flow session. The method includes storing the flow session in a database. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
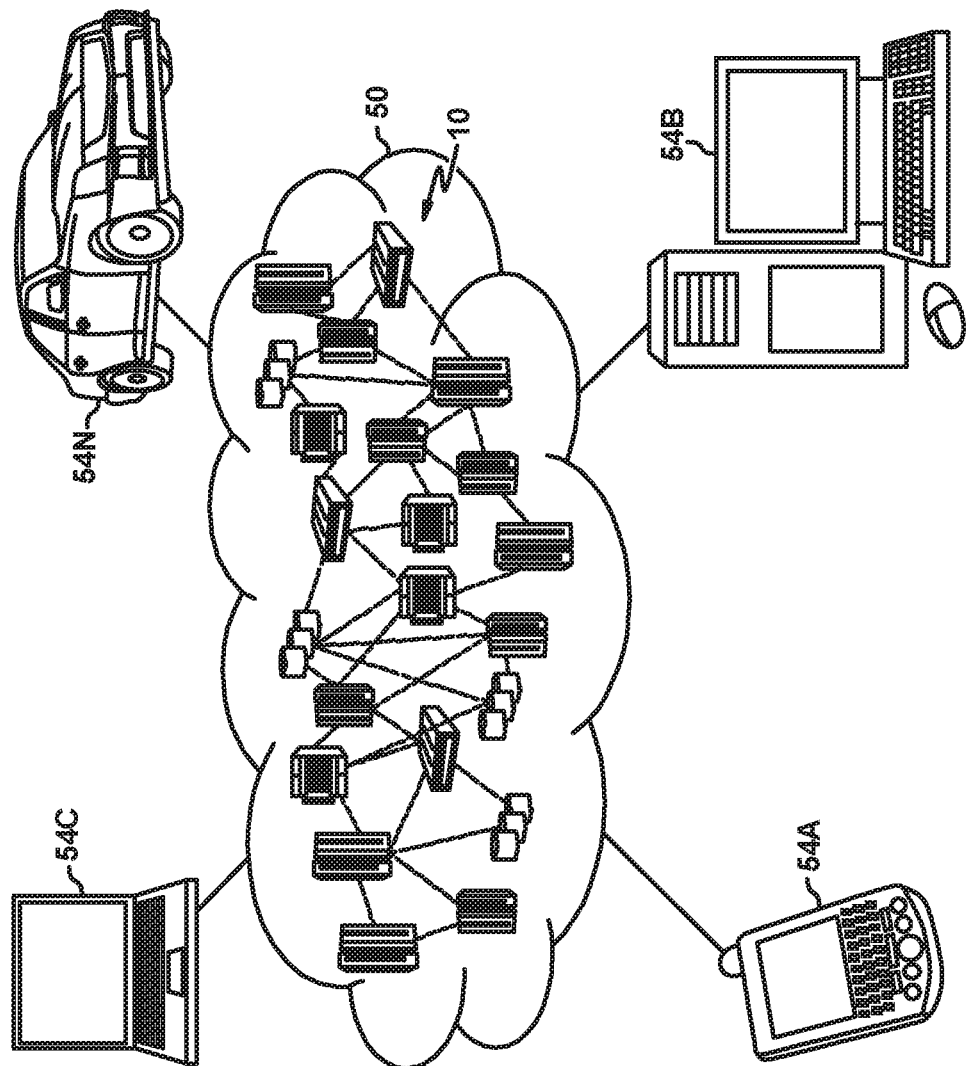
FIG. 1 depicts a cloud computing environment according to an embodiment of the present invention.

Network flow collectors are used to monitor network traffic and report on the different communications observed on the network. Individual data packets can be observed and grouped together to form summary records for the entire flow session. Monitoring network traffic can give warning of and assist in mitigating potential security threats to the network. The flow direction of each packet can have a significant effect on the security assessment of the data transfer.

In order to better identify security threats and reduce the number of false positive threats, embodiments of the present disclosure can determine the flow directions of data packet.

The following acronyms may be used below:
API application program interface
ARM advanced RISC machine
CD—compact disc ROM ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SPAN switched port analyzer
SRAM static random-access memory
TAP terminal access point
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 60 includes one or more cloud computing nodes 10 with which local computing devices used by cloud consumers, such as, for example, personal digital assistant (PDA) or cellular telephone 64A, desktop computer 64B, laptop computer 64C, and/or automobile computer system 64N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 1 are intended to be illustrative only and that computing nodes 10 and cloud computing environment 60 can communicate with any type of computerized device over any type of network and/or network addressable connection (e.g., using a web browser).

Figure 2:
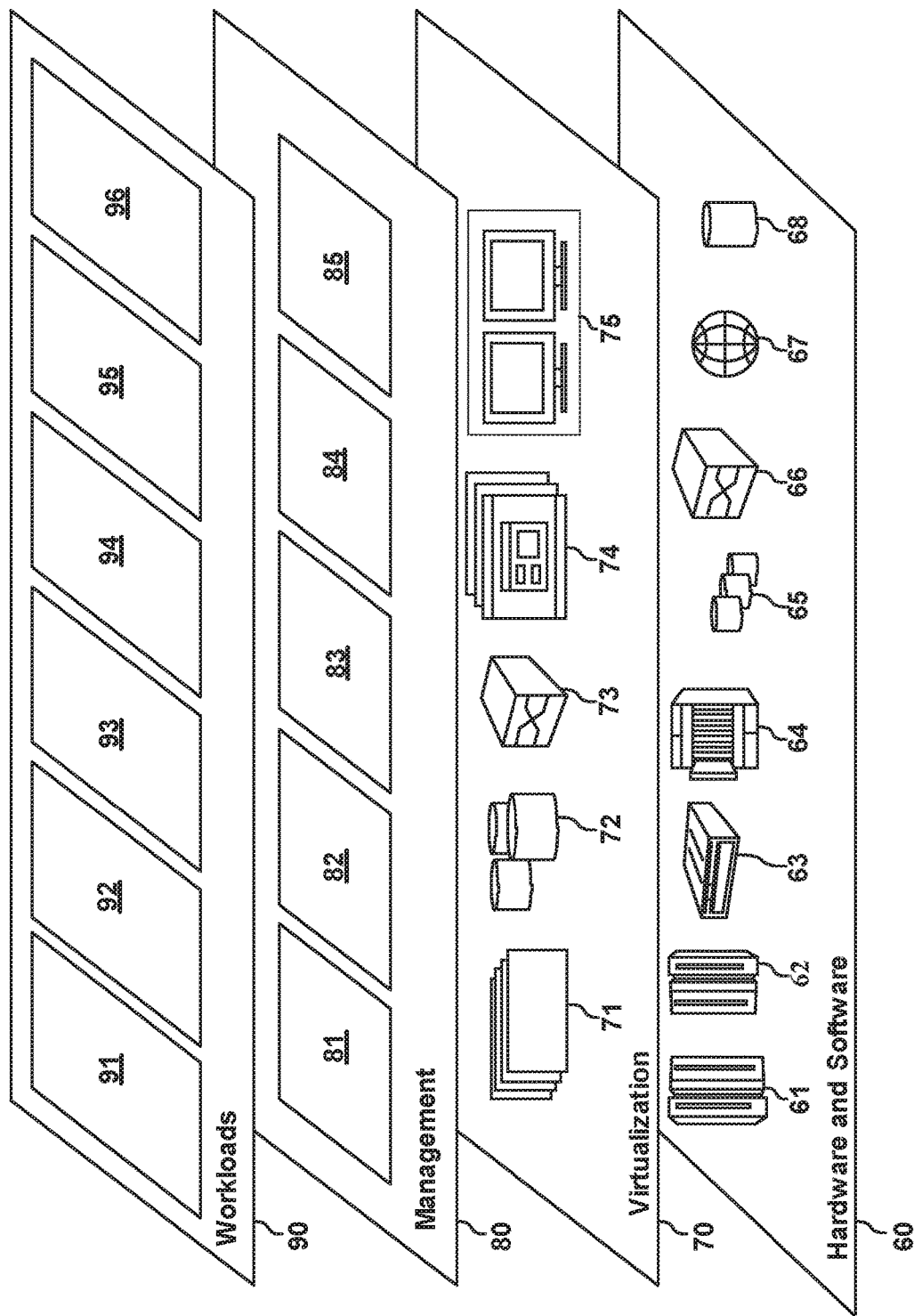
FIG. 2 depicts abstraction model layers according to an embodiment of the present invention.

Referring now to FIG. 2, a set of functional abstraction layers provided by cloud computing environment 60 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 66; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 76.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 86 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 96; and mobile desktop 96.

Data Processing System in General

Figure 3:
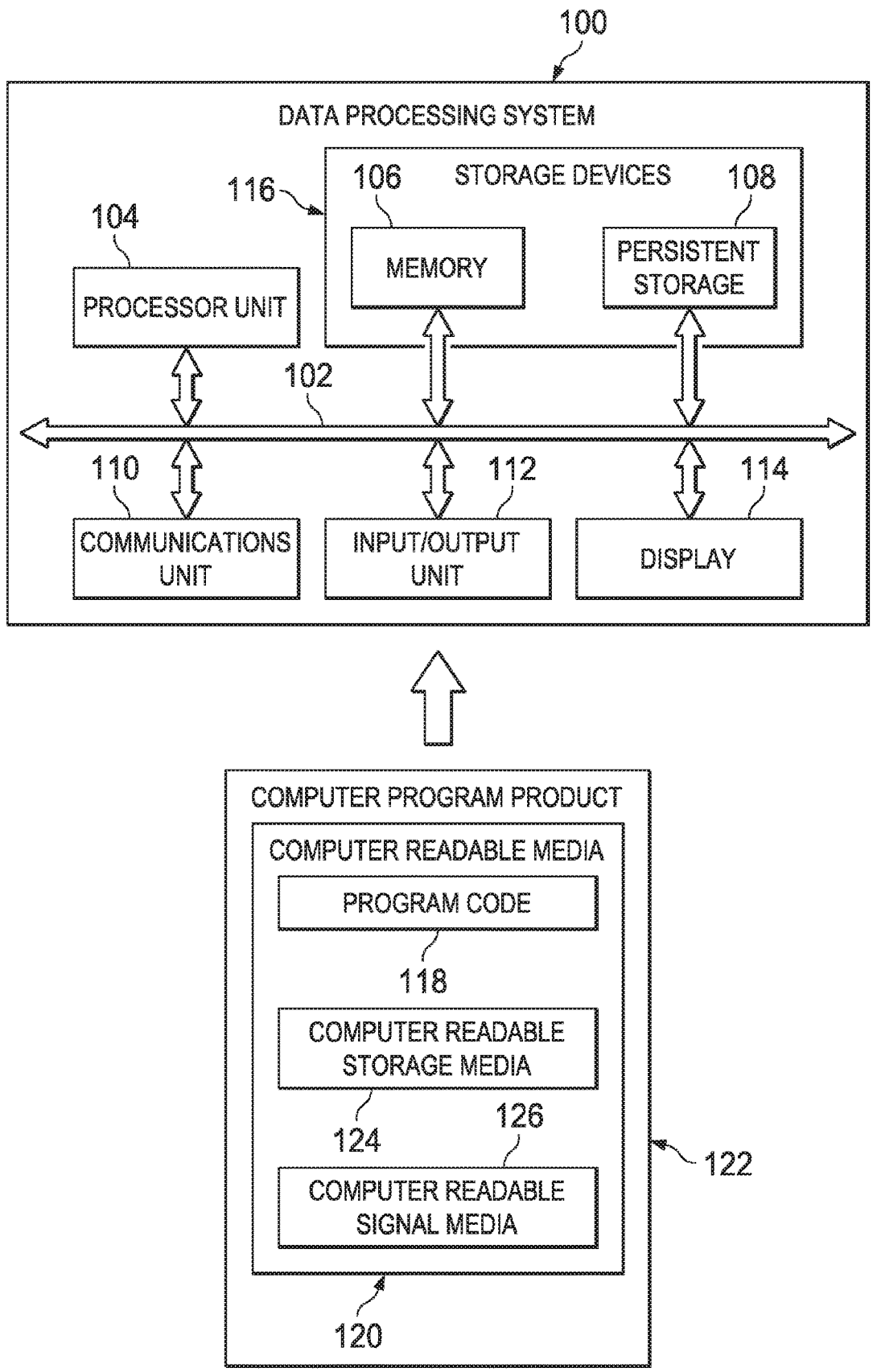
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Flow Direction Determination

Flow detectors capture data packets that are traveling across a network. Along with gathering data, flow detectors can attempt to detect the direction of the data flow. The direction of data flow can have a significant effect on identifying security threats, and/or other unwanted network traffic. Determining a flow direction can be difficult. Flow detectors do not necessarily sit inline in the network, but rather are connected into the network at an arbitrary point. The flow monitoring device can be connected via a terminal access point (TAP) and/or a switched port analyzer (SPAN, SPAN/mirror port). It is possible for packets to be lost along the network path and not be seen by the flow collector. Because flow detectors do not have capability to request retransmission, the missing packets can cause a flow direction determination to be incorrect.

Some embodiments attempt to overcome lost packets by using a static list of common destination ports. If one of the ports in the data session includes the common destination port, it can be assumed that port is the destination. However, this can fail to recognize certain security risks. It may miss a threat by assuming a source is a destination. Additionally, ports used as destinations can change over time and vary application to application. If a list is not updated, and/or a new port is used as a destination port, then this method can produce less accurate results.

Some embodiments attempt to use packet arrival time to determine flow direction. This does not resolve any issues if the initial packet of a flow session is lost. Additionally, some solutions are timeout or interval based to identify flow sessions. If no traffic is observed within a defined amount of time, then the flow session is considered complete. A delayed response from a server may be interpreted as a new flow session with the server as a source, rather than a destination.

Embodiments of the present disclosure can identify flow direction of data packets sent on a network. In some embodiments, a network flow detector dynamically tunes flow direction of data packets. In some embodiments, a network flow monitor observes data packets as they pass by the connection point. The data packets are sorted into flow sessions. The data for each flow session can be stored in a database.

In some embodiments, flow session data is analyzed. The analysis includes generating a list of common destination ports. Each port for each IP address is treated separately. In some embodiments, a confidence score is generated for each common destination port. The confidence score can be based on comparing the number of times a port is a destination against the number of times that same port is a source, frequency of use, and other similar factors.

In some embodiments, it is determined if a flow session has sufficient data to definitively determine a flow direction is known (or an observed flow direction is the true flow direction). This can be based on observing a specific set of packets and/or other metadata. The required metadata varies based on communication protocol for the flow session. In some embodiments, an observed flow session can be reversed. The reversal occurs when a port in the flow session has a confidence score above a predetermined confidence threshold. The confidence threshold can be input and/or updated by a user.

Reversing the observed flow direction for flow sessions so that the source is the likely originator of the communication can increase the effectiveness of security monitoring. The reversal can result in a reduced number of false positive security threats. That, in turn, allows resources allotted to examine positive (both true positive and false positive) security threats to be more focused on the true positives. Additionally, reversing the flow direction can increase the quality of network analysis.

The aforementioned advantages are example advantages, and embodiments exist that can contain all, some, or none of the aforementioned advantages while remaining within the spirit and scope of the present disclosure.

Figure 4:
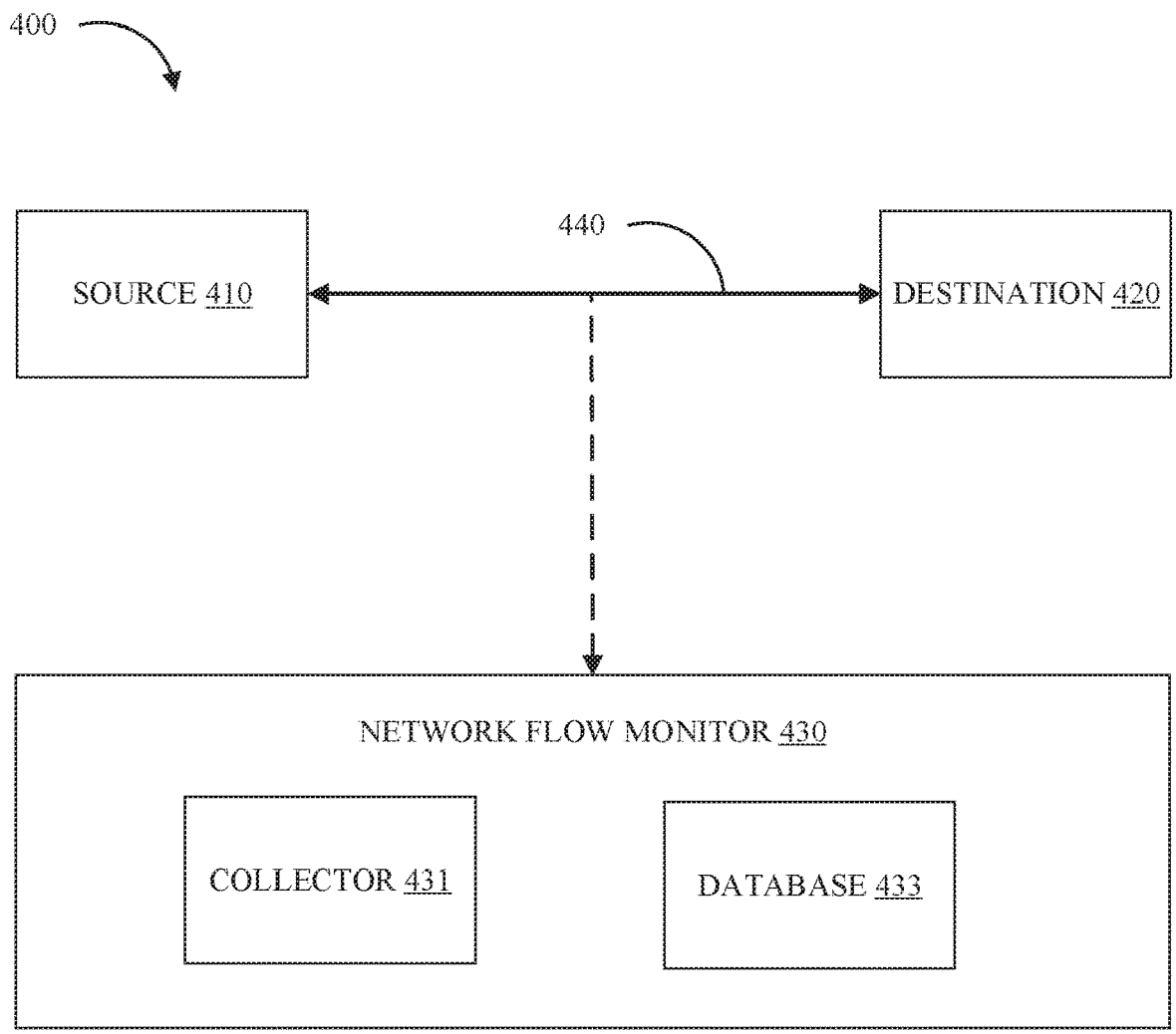
FIG. 4 is a functional diagram of a computing environment suitable for operation of a network flow monitor, in accordance with some embodiments of the present disclosure.

Referring now to various embodiments of the disclosure in more detail, FIG. 4 is a representation of a computing environment 400 that is capable of running a flow analyzer in accordance with one or more embodiments of the present disclosure. Modifications to the depicted environment may be made by those skilled in the art without departing from the scope of the disclosure.

Computing environment 400 includes source 410, destination 420, network flow monitor 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between source 410, destination 420, and other computing devices (not shown) within computing environment 400. In some embodiments, source 410, destination 420, and network flow monitor 430 may include a computer system, such as the data processing system 100.

Source 410 can be a standalone computing device, a management server, a web server, a mobile computing device, or any other electronic device or computing system capable of receiving, sending, and processing data. In other embodiments, source 410 can represent a server computing system utilizing multiple computers as a server system, such as in a cloud computing environment 50, which may constitute the computing environment 400.

In some embodiments, source 410 originates a flow session. The flow session includes sending and/or receiving a series of data packets with destination 420. In some embodiments, source 410 can generate and send data packets of any communication protocol (e.g., Transmission Control Protocol (TCP), User Datagram Protocol (UDP), HyperText Transfer Protocol (HTTP), etc.).

Destination 420 can be a standalone computing device, a management server, a web server, a mobile computing device, or any other electronic device or computing system capable of receiving, sending, and processing data. In other embodiments, destination 420 can represent a server computing system utilizing multiple computers as a server system, such as in a cloud computing environment.

In some embodiments, destination 420 is the target of a flow session. The flow session includes exchanging a series of data packets with destination 420. In some embodiments, destination 420 can receive and process data packets of any communication protocol (e.g., TCP, UDP, HTTP, etc.).

Source 410 and destination 420 represent a specific flow session. A particular computing device can be a source for one flow session and a destination for a different flow session.

Network flow monitor 430 can be any combination of hardware and/or software configured to monitor traffic on network. In some embodiments, network flow monitor 430 is connected at an arbitrary point along a data path between source 410 and destination 420. In some embodiments, network flow monitor 430 includes one or more of a TAP and SPAN.

In some embodiments, network flow monitor 430 mirrors (makes a copy of) each packet that passes the connection point. The original packet continues on to destination 420. The copy is saved and stored by network flow monitor 430. In some embodiments, network flow monitor 430 includes collector 431, and database 433.

Collector 431 can be any combination of hardware and software configured to gather and compile flow session data. In some embodiments, collector 431 receives each data packet gathered by flow monitor 430. The packets are sorted/grouped into flow records (or flow sessions). A flow record includes a source device, a source port, a destination device, a destination port, a plurality of data packets, and a communication protocol. In some embodiments, collector 431 collects metadata for each packet in the flow session, and for the flow session. The metadata can include a source IP address, a source port, a destination IP address, a destination port, a flow direction. The flow direction can include an observed flow direction, and an indication that observed flow direction has been flipped (i.e., reversed). The flow direction can be flipped by collector 431.

In some embodiments, collector 431 analyses each flow sessions to determine a source and a destination.

In some embodiments, collector 431 calculates/generates a confidence score for the flow direction. The confidence represents a likelihood that the determined flow direction is the actual flow direction. The flow direction determination can be based on each packet, device identifiers (e.g., IP address, etc.), port numbers (both source port and destination port), and other similar factors.

In some embodiments, collector 431 assigns a state value to each flow session. The state value can be used to generate the confidence scores. There can be any number of groups, each defined by one or more parameters. In some embodiments, collector 431 assigns each flow session into one of three groups. A state 1 flow session can be any flow session that includes enough data to determine the flow direction. For example, if the flow session is made over TCP, and the initial communications includes synchronization (SYN) and acknowledged (ACK) packets that are observed, then the originator of the flow session is known. Other protocols may require additional metadata. A state 2 flow session can be any flow session where at least one data packet was not observed (was lost), but collector 431 determines from previous data that a flow direction is known. For example, if a confidence for the destination IP address and destination port has a confidence above the relevant confidence threshold, then a flow direction can be known, but is marked as state 2. If this example, the direction could be flipped from the direction indicated by the packets. A state 3 flow session can be any flow session where there are lost data packets, and there is not enough data to determine the correct directions. In these cases, it can be assumed the direction of the first packet is the actual direction. This may occur if a confidence is found, but it falls below the relevant threshold.

Database 433 operates as a repository for data collected, analyzed, and generated by network flow monitor 430. In some embodiments, database 433 can be implemented with any type of storage device capable of storing data and configuration files that can be accessed and utilized by the components in computing environment 400, such as a database server, a hard disk drive, or a flash memory. Data received, used, and/or generated by container network flow monitor 430 can include flow session data, confidence scores, common destination ports, data packet size, flow session frequency, analysis results, packet type data, and other similar data. In some embodiments, database 433 receives and stores data from collector 431.

Methods 500 and 600 can be implemented by one or more processors, network flow monitor 430, collector 431, database 433, and/or a different combination of hardware and/or software. In various embodiments, the various operations of methods 500 and 600 are performed by one or more of source 410, destination 420, network flow monitor 430, collector 431, and database 433. For illustrative purposes, the methods 500 and 600 will be described as being performed by port network flow monitor 430.

Figure 5:
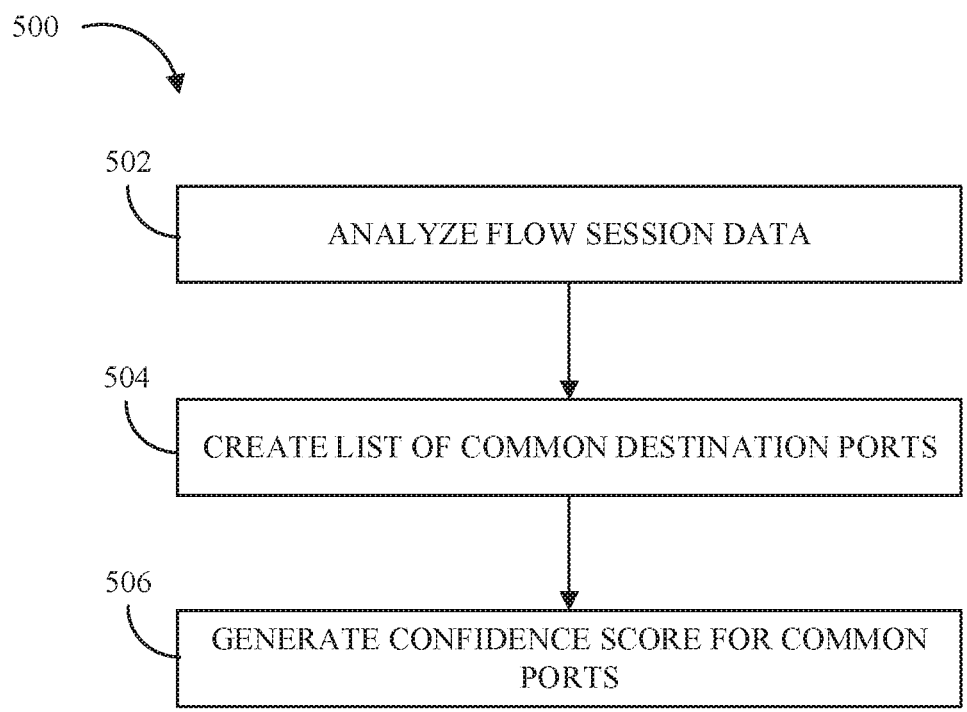
FIG. 5 is a flow chart of an example method to generate confidence score for common ports, in accordance with some embodiments of the present disclosure.

FIG. 5 depicts a flowchart of an example method 500, for determining network flow direction that can be performed in a computing environment (e.g., computing environment 400 and/or cloud computing environment 50). One or more of the advantages and improvements described above for determining network flow direction may be realized by method 600, consistent with various embodiments of the present disclosure.

At operation 502, network flow monitor 430 analyzes flow session data. In some embodiments, analyzed flow session data is from previously observed flow sessions. The analysis is performed for both ports in all flow sessions.

At operation 504, network flow monitor 430 creates a list of common destination ports. In some embodiments, any port that has been a destination in the analyzed flow sessions is added to the list of common destination ports. A destination can be an observed destination, a destination from a state 1 flow session, and/or a destination from a state 2 flow session. The list can be stored in database 433.

At operation 506, network flow monitor 430 generates a confidence score for each port in the list of common destination ports. The confidence score represents a likelihood that the port, if included in a flow session, is a destination rather than a source. The confidence score can be used to reverse an observed flow direction. In some embodiments, the confidence score is based on a percentage of times a port is the destination port, which can be determined by a variety of methods. Consider Port A on device A where one hundred unique flow sessions were observed. Ninety-seven of the flow sessions are state 1 with port A as the destination, two flow sessions are state 2 with port A as the destination, and one flow session is state 1 with Port A as the source. The confidence score can be based on the number of times the port is state 1, and would be 97%. In another example, the confidence score can be based on the number of times the port is a destination, at 99%. Another example, the state 2 results can be excluded, and the confidences would be ~98% and 100% respectively.

In some embodiments, the confidence score is based on the overall number of connections. As the number of times a particular port is a destination increases, the greater the confidence score could be. For example, assume port A has been a destination ten times, and port B five-hundred times.

The confidence score for port B can be higher relative to the confidence score for port A, even if every instance of port A is a state 1.

In some embodiments, the confidence score is based on time. The time may be incorporated as a rate. For example, the confidence score can be based on packets (or flow sessions) per period of time. As the rate increases, the confidence score for that port can increase. Time since first and/or most recent observation can be a factor. For example, assume Port A has had a relatively high confidence score for an extended period of time, and port B has had a similar confidence score for a shorter period of time. If both ports would have events that lower the confidence score, the Port A score would be less affected based on the longer history of being a destination port.

Figure 6:
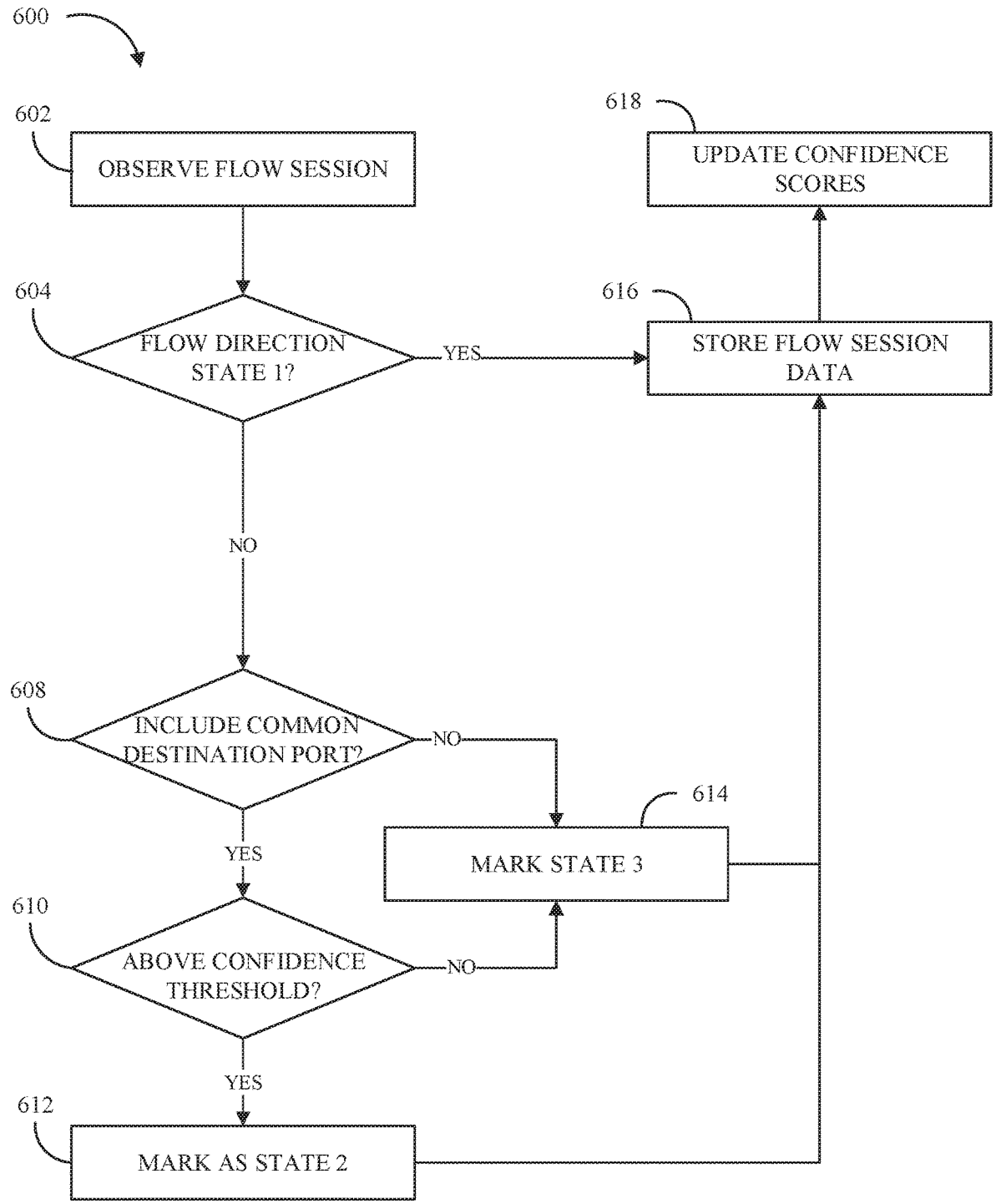
FIG. 6 is a flow chart of an example method to determine a flow direction of a flow session, in accordance with some embodiments of the present disclosure.

FIG. 6 depicts a flowchart of an example method, method 600, for determining network flow direction that can be performed in a computing environment (e.g., computing environment 400). One or more of the advantages and improvements described above for determining network flow direction may be realized by method 600, consistent with various embodiments of the present disclosure.

At operation 602, network flow monitor 430 observes (or receives) a flow session. In some embodiments, the flow session includes a plurality of data packets. The packets are mirrored and collected by collector 431 and/or network flow monitor 430. Each packet is grouped into a flow session. In some embodiments, an arrival time is collected with each data packet. The arrival time represent a physical time the packet was observed by network flow monitor. The arrival time can also be used as a factor in flow direction determination.

In some embodiments, operation 602 includes gathering metadata related to the flow session. The metadata includes at least a source identifier (e.g., IP address), a source port, a destination identifier, a destination port, and a protocol. In some embodiments, the metadata includes protocol-specific initiation data. Protocol-specific initiation data can be different for each protocol. The metadata includes any data necessary to fully determine a flow direction.

Operation 604 includes identifying if the flow direction conditions are satisfied. In some embodiments, the flow direction conditions are satisfied if the flow direction can be definitively identified. Flow sessions that are definitively identified can be marked as state 1 flow sessions. The direction conditions can be protocol specific. In some embodiments, one or more of the destination port, packet arrival time, and protocol specific initiation can be used as flow conditions.

If it is determined the flow direction conditions are satisfied (604: YES), then network flow monitor 430 proceeds to operation 616. If it is determined the flow direction conditions are not satisfied (604: NO), then network flow monitor 430 proceeds to operation 608.

At operation 608, network flow monitor 430 determines if the ports of the flow session includes a common destination port. In some embodiments, the ports include a common destination port if either the source port or the destination port, the port being associated to an IP address, are included in the common destination port list. In some embodiments, each port that has an associated confidence score is a common destination port. Operation 608 can be completed by comparing ports observed in operation 602 to the common destination port list. If the flow session includes a common destination port (608: YES), then network flow monitor 430 proceeds to operation 610. If the flow session does not include a common destination port (608: NO), then network flow monitor 430 proceeds to operation 614.

At operation 610, network flow monitor 430 determines if the relevant confidence score is above a confidence threshold. The confidence for both ports in the flow session can be checked against their relevant confidence thresholds. In some embodiments, operation 610 includes flipping (or reversing) the observed flow direction. The observed flow direction is based on the first observed packet in a flow session.

At operation 612, network flow monitor 430 marks the flow session as state 2. A state 2 flow session can be any flow session where at least one data packet was not observed (was lost), but where a port in the flow session has a confidence above the relevant threshold. In some embodiments, operation 612 includes an indication of whether the flow direction was reversed from the observed flow direction. Upon completion of operation 612, network flow monitor 430 proceeds to operation 616.

At operation 614, network flow monitor 430 marks the flow session as state 3. A state 3 flow session is recorded with no changes. In some embodiments, operation 614 includes an indication of the observed flow direction. Upon completion of operation 614, network flow monitor 430 proceeds to operation 616.

At operation 616, network flow monitor 430 stores flow session data. All data from each observed flow session is stored. In some embodiments, the flow session data is organized based on one or more of the flow session characteristics (e.g., source IP address, protocol, etc.). In some embodiments, operation 616 includes analyzing the flow session data. The data can be used to determine security threats (e.g., malicious access attempts), policy violations, and other similar data. In some embodiments, operation 616 includes displaying, to a user, the flow session data. The data may be displayed both as individual flow sessions (e.g. including the flow session metadata), and/or as aggregated/analyzed data.

At operation 618, network flow monitor 430 updates confidence scores. In some embodiments, updating the confidence score includes performing the operations of method 500. The continuous updating of confidence scores can have multiple effects. First it creates a dynamic list of common effective ports. Even as port numbers change, the network flow monitor 430 can better identify data flow paths to identify security vulnerabilities. Second, the confidence scores are continuously tuned. This can reduce the number of false positive (or flags) of potential security threats. This can increase the overall efficiency of security and network monitoring by allowing more resources to be allotted to the true positives rather than chasing down false positives.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising, on a processor of a network flow monitor:
observing a plurality of data packets as each data packet travels past a connection point;
identifying, from the plurality of data packets, a flow session, wherein the flow session comprises a source port, a source device, a destination device, a destination port, and a communication protocol;
gathering, from the plurality of data packets, directional metadata;
analyzing a set of previously observed flow sessions;
creating a list of common destination ports;
generating a confidence score for each port on the list of common destination ports, wherein the confidence score represents a likelihood that each port on the list of common destination ports is the destination port of the flow session when included in the flow session;
comparing the source port and the destination port against the list of common destination ports;

determining, based on the plurality of data packets, a flow direction of the flow session wherein the flow direction of the flow session is reversed from an observed flow direction in response the confidence score exceeding a confidence threshold; and storing the flow session in a database.

2. The method of claim 1, wherein each port in the list of common destination ports is included in the set of previously observed flow sessions.

3. The method of claim 1, wherein the generating of the confidence score is based on a number of times a port is a destination compared to a number of times the port is a source.

4. The method of claim 1, wherein the confidence threshold is input by a user.

5. The method of claim 1, wherein the flow session is marked as state 2 in response to reversing the flow direction of the flow session, wherein state 2 indicates at least one data packet from the flow session was not observed.

6. The method of claim 1, wherein the flow session is marked as state 3 in response to the confidence score being less than the confidence threshold, wherein state 3 represents the flow direction cannot be determined from the plurality of data packets.

7. The method of claim 1, wherein the protocol is transmission control protocol (TCP), and directional metadata includes a synchronization (SYN) data packet and an acknowledgement (ACK) data packet.

8. The method of claim 1, wherein the directional metadata is based on the protocol.

9. The method of claim 1, further comprising:
updating, in response to the storing the flow session, the confidence score for each port on the list of common destination ports.

10. The method of claim 1, wherein the flow session is marked as state 1 in response to determining the flow direction based on the directional metadata.

11. The method of claim 1, wherein the reversing the flow direction reduces a number of false positive security threats.

12. The method of claim 1, further comprising:
updating, in response to the determining the flow direction, each confidence score for each port on the list of common destination ports.

13. A system comprising:
a processor; and
a computer-readable storage medium communicatively coupled to the processor and storing program instructions which, when executed by the processor, are configured to cause the processor to:
observe, by a network flow monitor, a plurality of data packets as each data packet travels past a connection point;
identify from the plurality of data packets, a flow session, wherein the flow session comprises a source port, a source device, a destination device, a destination port, and a communication protocol;
gather, from the plurality of data packets, directional metadata;
analyze a set of previously observed flow sessions;
create a list of common destination ports;
generate a confidence score for each port on the list of common destination ports, wherein the confidence score represents a likelihood that each port on the list of common destination ports is the destination port of the flow session when included in the flow session;
compare the source port and the destination port against the list of common destination ports;
determine, based on the plurality of data packets, a flow direction of the flow session, wherein the flow direction of the flow session is reversed from an observed flow direction in response the confidence score exceeding a confidence threshold; and
store the flow session in a database.

14. The system of claim 13, wherein each port in the list of common destination ports is included in the set of previously observed flow sessions.

15. The system of claim 13, wherein the generation of the confidence score is based on a number of times a port is a destination compared to a number of times the port is a source.

16. The system of claim 13, wherein the reversing the flow direction reduces a number of false positive security threats.

17. A computer program product, the computer program product comprising a computer readable storage medium having program instructions embodied therewith, the program instructions executable by a processing unit to cause the processing unit to:
observe, by a network flow monitor, a plurality of data packets as each data packet travels past a connection point;
identify from the plurality of data packets, a flow session, wherein the flow session comprises a source port, a source device, a destination device, a destination port, and a communication protocol;
gather, from the plurality of data packets, directional metadata;
analyze a set of previously observed flow sessions;
create a list of common destination ports;
generate a confidence score for each port on the list of common destination ports, wherein the confidence score represents a likelihood that each port on the list of common destination ports is the destination port of the flow session when included in the flow session;
compare the source port and the destination port against the list of common destination ports;
determine, based on the plurality of data packets, a flow direction of the flow session wherein the flow direction of the flow session is reversed from an observed flow direction in response the confidence score exceeding a confidence threshold; and
store the flow session in a database.

18. The computer program product of claim 17, wherein each port in the list of common destination ports is included in the set of previously observed flow sessions.

19. The computer program product of claim 17, wherein the generation of the confidence score is based on a number of times a port is a destination compared to a number of times the port is a source.

* * * * *